Clifford E. Myers
INVENTOR
BY
Kolisch & Hartwell
Attys.

United States Patent Office 3,551,190
Patented Dec. 29, 1970

1

3,551,190
WOOD IMPREGNATION
Clifford E. Myers, Forest Grove, Oreg., assignor to Welsh Panel Company, Longview, Wash., a corporation of Washington
Filed Aug. 30, 1968, Ser. No. 756,578
Int. Cl. B05c 3/04
U.S. Cl. 117—116        10 Claims

ABSTRACT OF THE DISCLOSURE

Impregnation of a porous article such as wood with a liquid medium by immersing the article in the medium and using compressional wave energy directed against the article through such medium to accelerate the impregnation by removing air as such forms on the surface of the article.

---

This invention relates to the impregnation of a porous material, such as wood, with a liquid treating medium, such as a fire-retardant material, utilizing compressional wave energy whereby faster, more effective impregnation of the article is produced. Wood, unlike metal, undergoes compression and expansion when exposed to compressional wave energy, and this action in the wood promotes movement of the treating medium into the wood.

In the treatment of a wooden article, such as a panel or other piece of lumber, with a treating solution, such as a fire retardant, or a wood preservative, the amount of treating solution which enters into and is retained by the wood is related to the amount of air which the treating solution displaces within the wood. Wood is a cellular, somewhat porous type of material and as such, contains in its natural state a considerable amount of gas comprising primarily air and minor amounts of vapor substances such as water vapor, etc. Various procedures have been suggested in the past for increasing the amount of impregnation that can be obtained in a wood panel or other article in a given period of time over that to be expected with mere soaking, but results today have not been entirely satisfactory. Most processes that have been developed are batch-type processes, requiring extended pressure treatments. The amount of time required for treatment, the equipment needed, and manpower requirements have generally been such as to make any articles treated by present day procedures inordinately expensive except for very special applications.

In general terms, this invention has for its object the provision of a novel process for impregnating a wood article, such as a panel, with a treating solution or liquid medium, which utilizes compressional wave energy in a novel manner found greatly to accelerate the rate at which the impregnation proceeds.

Another object is to provide such a process which is susceptible of being carried out continuously.

More specifically, an object of the invention is to provide an impregnation process, where impregnation takes place through a face of the article, and such face, during the impregnation process, is exposed while immersed in a liquid treating medium to compressional wave energy directed against the face in such a manner as to promote the removal of the air which tends to form on the surface of the article. Air is expressed from a wooden article on the article being exposed to compressional wave energy, and tends to collect as a blanketing film over the face of the article. This film, if not removed, impairs the effectiveness of the impregnation process, since it absorbs the wave energy and thus prevents proper transmission of the energy to the wood. With the removal of such air as contemplated herein, a more efficient transmission of energy to the wood results.

The invention further features, as an object, a process of impregnation utilizing compressional wave energy to accelerate the impregnation, where a subatmospheric pressure is provided above the treating solution for the purpose of facilitating the removal of air, and reducing the pressure of the liquid treating medium.

The compressional wave energy contemplated may have a frequency ranging from sonic to ultrasonic, and is producible in a wave generating station which usually comprises an electrically operated transducer. The transducer produces a beam of compressional wave energy which is directed through the impregnating medium against the face of the wood article, with such liquid impregnating medium then functioning as the propagation medium for the compressional wave energy.

The invention further has as objects the use of compressional wave energy at multiple frequencies, for the reasons hereinbelow made apparent.

As another object the invention contemplates through controlled interaction of a beam of compressional wave energy with the face of a wooden article, a method of impregnation where an escape flow of any air forming on the panel is produced which extends laterally of the beam of the compressional wave energy, the air thus not tending to become stagnant on the panel face.

Other objects and advantages will become more fully apparent as the following description is read in conjunction with the accompanying drawings, wherein.

Figure 1:
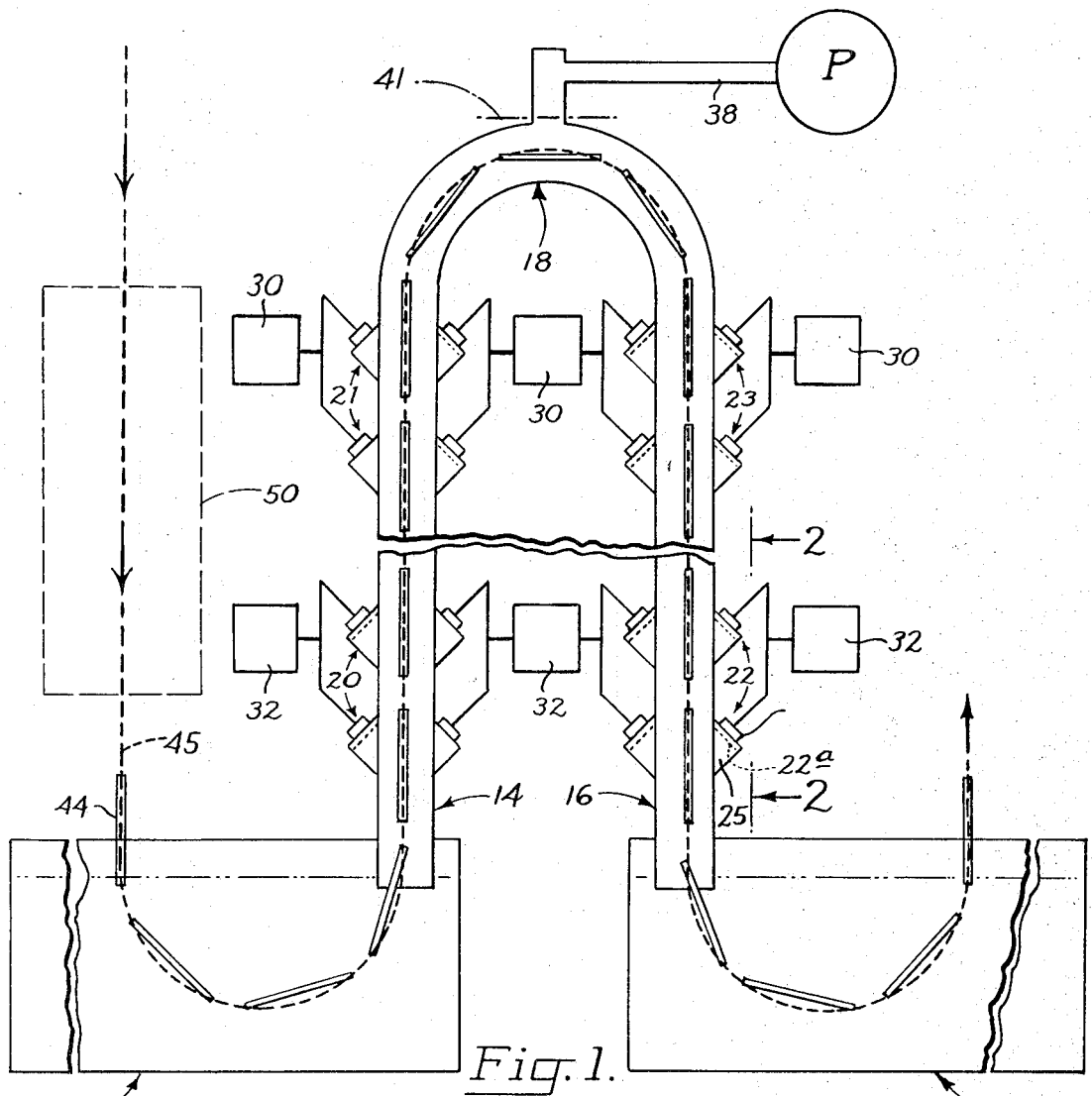
FIG. 1 is a schematic illustration of apparatus usable according to the invention to treat wood panels continuously, with such panels becoming impregnated through their opposite faces with a liquid treating medium.

Explaining the invention in more detail, wood contains within its cellular structure a considerable amount of gas, principally air, which is displaced from the wood when impregnated with a liquid medium, such as a preservative or fire-retardant chemical solution. By directing a beam of compressional wave energy against the face of a wooden article, the face of the article vibrates on absorbing the compressional wave energy, and such movement promotes impregnation of the wood with the liquid treating medium. However, the treatment is not truly effective unless some procedure is provided for removing the film of air which tends to collect over the face of the wood after short exposure to compressional wave energy. Air is a compressible medium, and as such functions to cushion the face of the wood. With such cushioning, wave energy propagated through the liquid treating medium in which the wood is immersed is prevented from striking the wood face with full force.

According to this invention it has been discovered that a wooden article, such as a panel, immersed in a liquid treating medium, such as a fire-retardant chemical, can be very effectively impregnated with the liquid treating medium if there is suitable interaction provided between the beam and the face of the panel to produce an escape flow for air which extends laterally of the beam. Such interaction may be produced by moving the panel across the beam of compressional wave energy during treatment, whereby air which collects on the panel face by being dragged with the panel is moved with progression of the panel laterally of the beam. Another procedure which has been found to be particularly effective is to direct the compressional wave energy at an acute angle against the face of the panel. With the angle of incidence of the beam on the panel face being at an acute angle, the reverberating action of the panel face tends to throw off any air film at an angle directed to the side of the incoming beam.

In a particular and preferred embodiment of the invention, the compressional wave energy is directed at an acute angle against the face of a panel, and the panel during the impregnation process is moved so that the face of the panel which is to be impregnated travels obliquely toward (as opposed to away from) the beam of compressional wave energy. Also, the faces of the panel are held upright, i.e., substantially perpendicular, or if inclined from perpendicular, not more than forty-five degrees from perpendicular. With such circumstances met, any air which migrates to the face of the panel is removed from the face by a wiping action, whence such air travels upwardly in bubble form to the surface of the liquid in which the panel is immersed. With the panel being upright, a pocket of air is prevented from collecting under an underface of the panel, which promotes the removal of air. The wiping action is against the travel direction of the face of the panel with the panel moved obliquely toward the beam, whereby air wiped from the panel face is not thrown onto the panel face in regions of the face leaving the zone of incidence of the beam. Thus, on moving out of the beam produced by a wave-generating station, the face of the panel is relatively free of air and in optimum condition for impregnation with treating medium on moving into the beam of any succeeding generating station.

The pressure condition exisiting in a given region of a liquid treating medium effects the efficiency with which the compressional wave energy is propagated through the liquid medium, and with different pressures, most efficient propagation of compressional wave energy occurs with different frequencies. Further explaining, where a relatively high pressure condition exists, such as is present at a relatively low point of elevation in a pool of treating medium (because of the pressure exerted by the body of liquid over such point), optimum propagation is obtained with a frequency which is lower than the frequency producing optimum propagation with a lower pressure condition. A higher frequency is indicated where the pressure of the treating medium is low, as the liquid is better enabled to move in a manner promoting propagation. Where feasible, a relatively high frequency ranging up to about forty kilocycles has been found best to remove any air film which tends to form on the surface of the wood. With a frequency much exceeding forty kilocycles, apparently wood tends to absorb the energy without obtaining proper penetration by the immersing liquid. An important part of this invention is the recognition that the use of different frequencies at different elevations in a pool of treating medium, where different pressures exist, produces advantageous results.

In carrying out the invention, it is further preferred that a subatmospheric condition, or vacuum be maintained above the pool of liquid treating medium, as such reduces to below atmospheric the pressure which is exerted on the surface of the pool, promoting the rise of any air removed from the panel faces upwardly through the pool to the pool's surface, whence it may be discharged from the system. Further, with a subatmospheric condition existing above the pool, the pressure of the liquid treating medium at points distributed down through the pool is reduced, enabling the use of a higher frequency for the compressional wave energy (with better air removal).

For optimum impregnation, the panel treated should have a low moisture content before immersion in the treating solution. It is best if the moisture content of the panel be below about ten percent (on a weight basis and based on the dry weight of the wood), and preferably below about six percent. With a panel initially having a low moisture content, there is less need of replacing moisture in the panel with the liquid which comprises the treating solution, and better impregnation with chemical results.

Considering now apparatus such as may be utilized in performing the invention, and referring to the drawings, shown at 10 and 12 are open top tanks utilized to contain a volume of the liquid treating medium to be used in the impregnation process. By way of example, and in the treating of panels to obtain fire resistance, such treating medium might comprise an aqueous solution of diamonium phosphate, or other fire-retardant chemical.

Extending upwardly from a side of tanks 10 and 12 are elongated hollowing casing structures 14 and 16, respectively. Each casing structure is designed to hold a column of liquid with a subatmospheric pressure produced adjacent the top of the casing structure. The liquid is forced upwardly to form a column within a casing structure by atmospheric pressure which exerts a downward force on the exposed surfaces of the liquid pools contained in tanks 10 and 12. Joining the upper extremities of casing structures 14, 16 is a tunnel 18 which provides a passage connecting the upper extremities of the casing structures. Casing structures 14, 16 and tunnel 18 together constitute what is referred to as a processing housing in the apparatus.

Along each side of each casing structure are a series of compressional wave-generating stations, shown for casing structure 14 at 20, 21, and for casing structure 16 at 22, 23. These various wave-generating stations are similar, and only one will be described in any detail.

Specifically, and considering a generating station 22, a hollow housing protruding out from and with an interior communicating with the interior of casing structure 16 is shown at 25. Within this housing is a diaphragm or plate 22a, disposed in a plane which is inclined to the longitudinal axis of casing structure 16. The plate is caused to vibrate at a sonic or ultrasonic frequency by a series of transducers arranged in a row, and mounted on the back side of the plate, such transducers being shown at 22b. Each transducer may be a conventional unit, and is operable to convert electrical energy fed to it varying at a certain frequency into mechanical vibrations of the diaphragm or plate. There is no intent to be limited to any specific type of transducer, as such may be natural or artificially polarized piezoelectrics, electrostrictive or magnetostrictive.

With operation of the transducers, a beam of compressional wave energy is emitted from the diaphragm, and such is propagated through the treating medium in the direction normal of the plate into the path of panels which are advanced through the casing structures. As will be explained, such panels are moved with their faces paralleling the longitudinal axis of the casing structure, and the compressional wave energy emitted from a generating station, therefore, where incident on the face of a panel, extends at an acute angle relative to said face.

It will be noted in FIG. 1 that wave-generating stations are provided on each side of the casing structure, each station directing a beam of energy inwardly and at an acute angle to the axis of the casing structure, whereby both sides of a panel passing through the casing structure is exposed to such energy.

Shown at 30 and 32 are generators for producing current varying at a certain frequency. Generators 32, which supply current to the compressional wave-generating stations adjacent the bottoms of the casing structures, may produce current varying at a frequency of, for example, fifteen kilocycles. The other generators supplying current to wave-generating stations adjacent the tops of the casing structures supply current at a somewhat higher frequency, for example, twenty-five kilocycles.

A conduit 38 connects with tunnel 18 connecting the tops of the casing structures, and this conduit is connected to a suitable vacuum pump 40. With operation of the pump, a vacuum is produced inside the processing housing. With the liquid medium in tanks 10 and 12 exposed to atmospheric pressure, and with a vacuum produced inside the processing housing, such liquid medium is forced to rise within the casing structures of the processing housing until it reaches a level such as the level indicated at 41. With the liquid medium ordinarily having a specific gravity which is somewhat greater than water, and with the vacuum producible by the pump being somewhat less than a perfect vacuum, a processing housing might be utilized where the height of the column of liquid within the processing housing lies in the range of twenty-four to twenty-seven feet.

It is contemplated that panels be moved continuously through the processing housing on a conveyer. The conveyer has been shown in FIG. 1 by a dashed outline 45 for reasons of simplicity. Panels are shown at 44, in the various positions that they assume on traveling through the processing housing while moved by conveyor 45. The panels may remain immersed in the liquid medium from the time they enter tank 10 until they leave tank 12. The edges of the panels are depicted in FIG. 1 and, it will be noted that on traveling through the casing structures, their faces parallel the longitudinal axes of the casing structures.

Indicated in dashed outline at 50 is an oven such as an infrared oven that may be employed in initially drying the panel processed. The oven is conventional, and may be employed to reduce moisture content in any panel to within the preferred range of up to about six percent.

Describing the processing of four by eight foot plywood panels to render them fire retardant, a liquid medium or treating solution, of diammonium phosphate may be utilized, comprising an aqueous solution of diammonium phosphate (seventeen percent by weight phosphate salt). A vacuum is produced by a vacuum pump sufficient to produce columns of such solution in the processing housing approximately twenty-five feet high. In the processing housing, eight compressional wave structure generating stations are provided on each side of each casing. The power-input to each generating station is five kilowatts. The frequency of the compressional wave energy produced in the upper four generating stations on each side of each casing structure is twenty kilocycles, whereas the frequency of the compressional wave energy produced in the lower four generating stations is ten kilocycles.

Panels are moved through the processing housing by conveying them continuously, with such entering tank 10, then moving up casing structure 14, thence moving into casing structure 16 through tunnel 18, and finally emerging from tank 12.

Figure 3:
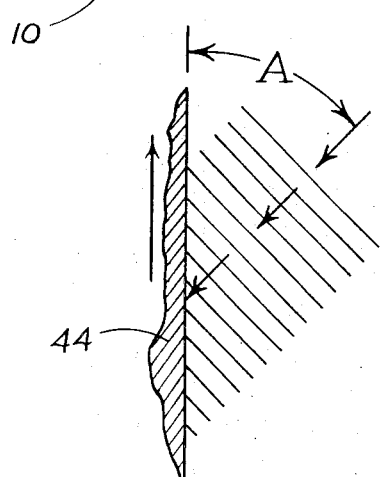
FIG. 3 illustrates how a beam of compressional wave energy emitted from a wave-generating station is directed toward the face of a wood panel, with such beam, where incident on the face, extending at an acute angle.
Figure 2:
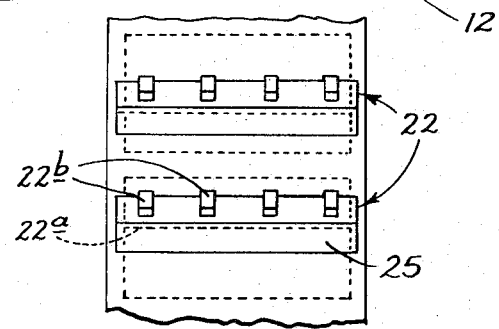
FIG. 2 is a view, on a somewhat larger scale, showing wave-generating stations provided in the apparatus, and a bank of transducers utilized in a wave-generating station.

On advancing through the processing housing, the panels move with the planes of their faces moving obliquely toward the beam of compressional wave energy emitted by a wave-generating station. As best shown in FIG. 3, the beam of energy emitted from each station, where incident on the face of the panel, extends at an acute angle relative to the face, such angle being shown in FIG. 3 at A. While such angle may vary from about fifteen to seventy-five degrees, ordinarily an angle of incidence of about forty-five degrees is selected.

On the compressional wave energy from a generating station being directed against each face of a panel and with impregnation of the panel with solution, air is displaced and migrates to the faces of the panel. The action of each beam of compressional wave energy is such as to cause a wiping of air from a panel face, with such air rising as bubbles to the surface of the solution in the processing housing. On moving from the beam emitting from one station to the beam emitted by the next adjacent station, the panel face is free of any air film. With the faces vertical, there is no tendency to entrap air under a side of the panel.

With the procedure described, one-quarter inch three-ply Douglas fir panels were impregnated with treating solution with a relatively high degree of chemical retention obtained (the panels showed an average retention of three pounds per cubic foot) in a relatively short processing time.

With a vacuum maintained above the surface of the liquid medium used in the impregnation process, air traveling to the top of the processing housing was removed from the system. Further, the pressure of the treating liquid at points distributed throughout the columns of liquid in the processing housing was less than if atmospheric pressure had existed above the columns of liquid.

In all panel treatments performed, air was observed to migrate to the surface of the panel when the panel was exposed to a beam of compressional wave energy. This air was removed to promote panel impregnation by producing an escape flow for air which extends laterally of the beam either by dragging the air with the panel by movement of the panel across the beam, by directing the beam at an angle against the panel's face, or by the wiping action produced when panels are processed as in the apparatus illustrated in FIG. 1.

While an embodiment of the invention has been described, obviously variations are possible without departing from the invention. It is desired to cover all such variations as would be apparent to one skilled in the art and that come within the scope of the appended claims.

It is claimed and desired to secure by Letters Patent:

1. A method of impregnating a wood article through a face thereof with a liquid medium, utilizing compressional wave energy in a frequency ranging from sonic to ultrasonic, comprising immersing the article in a pool of such medium, directing a beam of compressional wave energy from a wave-generating station located to one side of said face through said medium and against said face, and producing through the interaction of the beam of compressional wave energy with the face of the article an escape flow of air with such flow extending laterally of the beam of compressional wave energy and the escape flow being effective to remove such air as collects on the face of the article.

2. The method of claim 1, wherein the escape flow of air is produced by directing the beam of compressional wave energy at an angle toward the face of the article so that the beam, where incident on said face, extends at an acute angle relative to said face, and air which collects on said face during the impregnation process is removed through the reverberatory action resulting from the acute angle of incidence of said beam.

3. The method of claim 1, wherein the escape flow of air is produced by moving the article so that its face moves across the beam during the impregnation process.

4. The method of claim 1, wherein said wood article is advanced through said liquid medium during the impregnation process with its said face, while being so advanced, moving obliquely toward the beam of compressional wave energy emitted from said wave generating station.

5. The method of claim 1, wherein a subatmospheric pressure is maintained above the liquid medium during the impregnation process.

6. The method of claim 1, wherein said wood article is advanced through said liquid medium during the impregnation process with its face, while being so advanced, moving obliquely toward the beam of compressional wave energy emitted from said wave generating station, and wherein a subatmospheric pressure is maintained above the liquid medium during the impregnation process.

7. The method of claim 1, wherein multiple beams of compressional wave energy are directed against such face from wave-generating stations disposed at at least two different elevations; and the frequency of the compressional wave energy in the more elevated of said two beams is higher than the frequency of the compressional wave energy in the other beam.

8. The method of claim 7, wherein said wood article is advanced through said liquid medium during the impregnation process with its said face, while being so advanced, moving obliquely toward the beam of compressional wave energy omitted from the wave generating station.

9. The method of claim 6, wherein said advancement of the article is along an upright path, and the generating stations of said two beams are spaced at different elevations along said path.

10. The method of claim 9, wherein a subatmospheric pressure is maintained above the liquid medium during the impregnation process.

References Cited

UNITED STATES PATENTS

| | | | |
|---|---|---|---|
| 2,786,784 | 3/1957 | Henriksson | 117—116 |
| 2,960,314 | 11/1960 | Bodine | 165—1 |
| 2,996,038 | 8/1961 | Hunicke | 117—61X |
| 3,033,158 | 5/1962 | Bodine | 116—27X |
| 3,098,370 | 7/1963 | Poole | 118—419X |
| 3,231,025 | 1/1966 | Bodine | 111—7X |

ALFRED L. LEAVITT, Primary Examiner

D. A. SIMMONS, Assistant Examiner

U.S. Cl. X.R.

117—59, 61, 119; 118—50, 612